Figure 12:
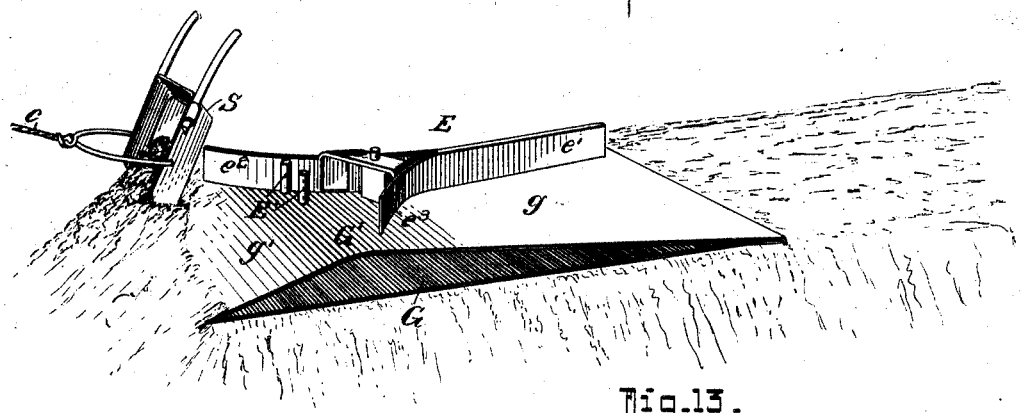

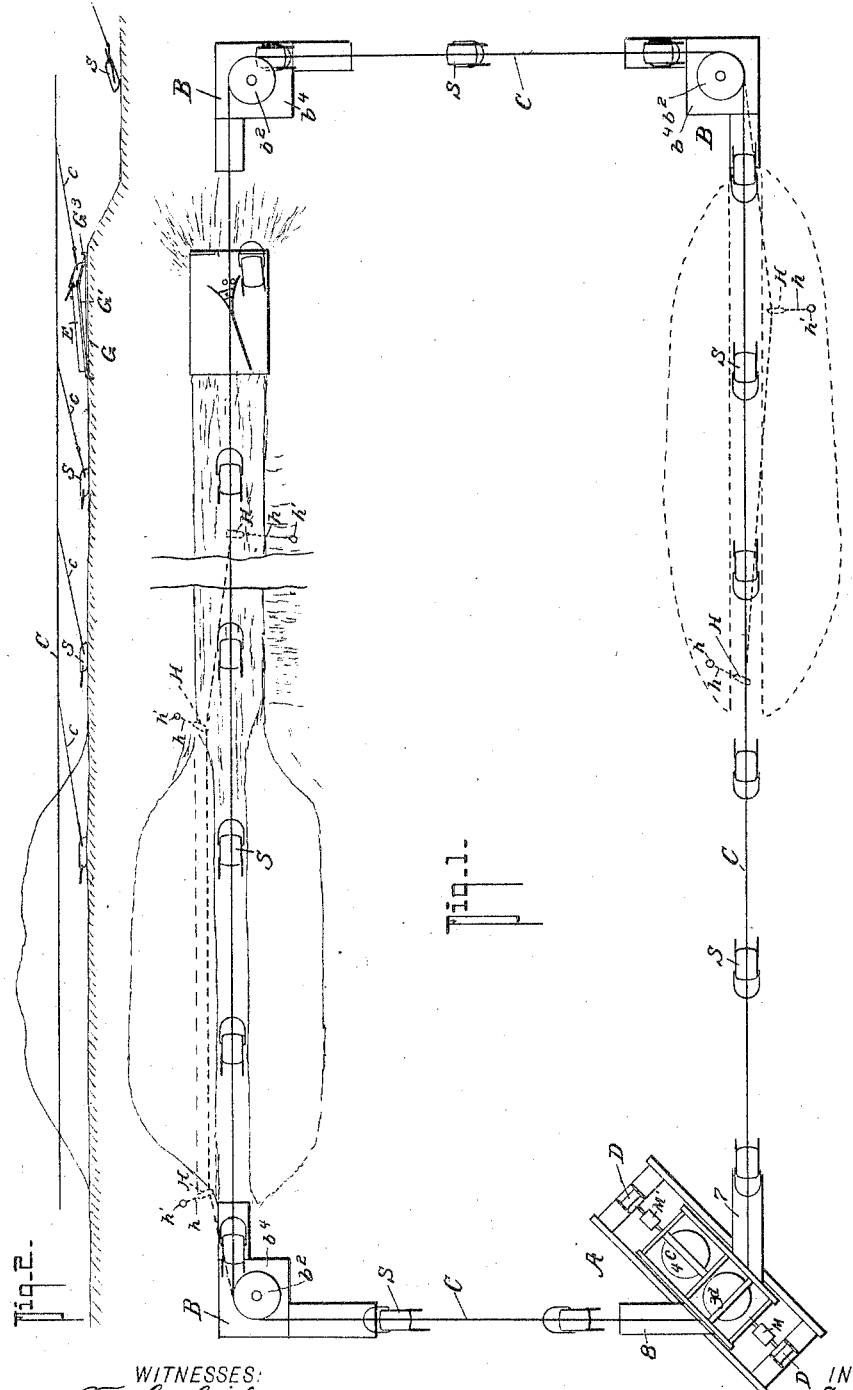

No. 776,990. PATENTED DEC. 6, 1904.
S. H. BLOOMER.
GRADING AND EXCAVATING MACHINE.
APPLICATION FILED MAR. 8, 1904.
NO MODEL. 5 SHEETS—SHEET 2.
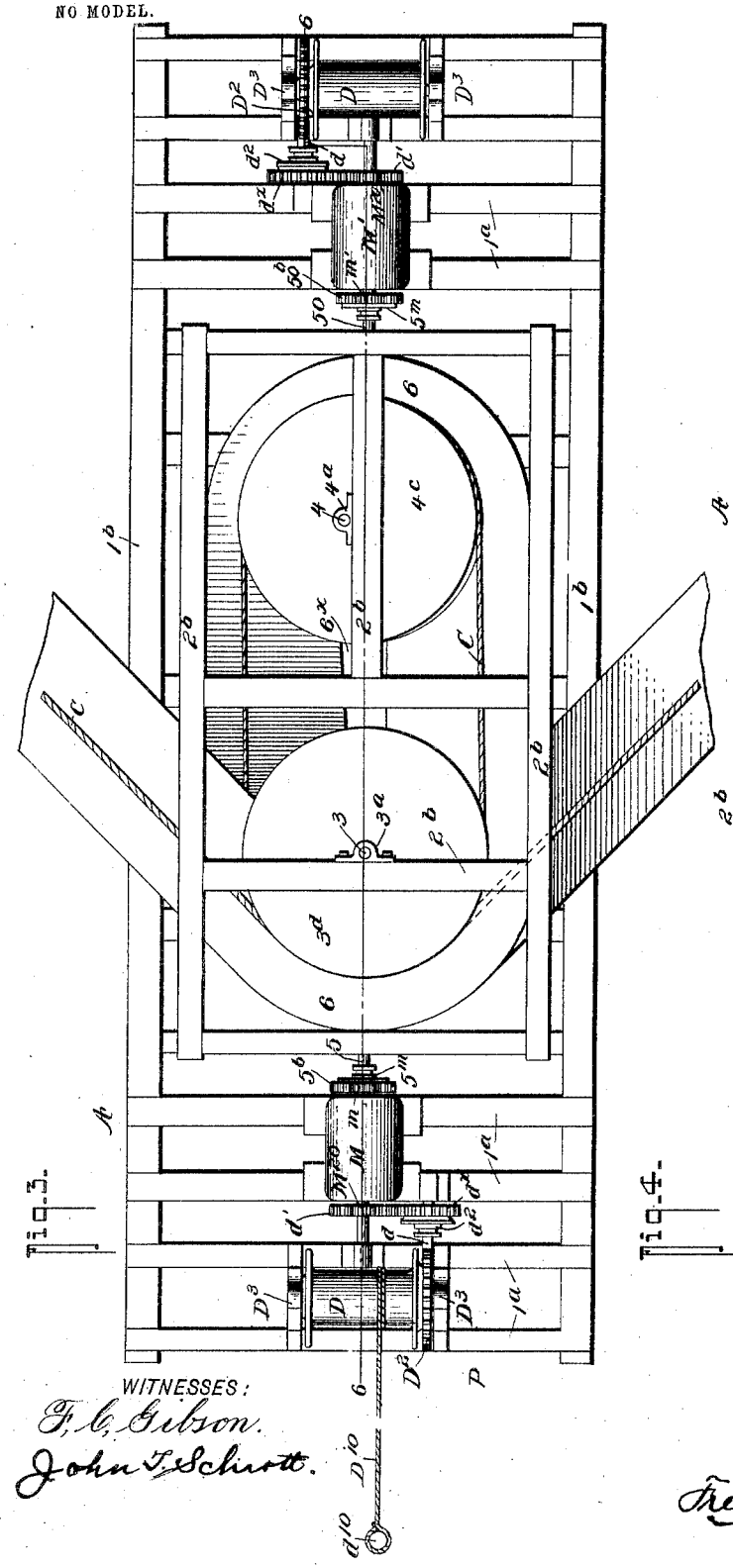
WITNESSES:
F. C. Gibson.
John T. Schrott.
INVENTOR
S. H. Bloomer.
BY
Fred G. Dieterich & Co.
ATTORNEYS No. 776,990. PATENTED DEC. 6, 1904.
S. H. BLOOMER.
GRADING AND EXCAVATING MACHINE.
APPLICATION FILED MAR. 8, 1904.
NO MODEL. 5 SHEETS—SHEET 3.
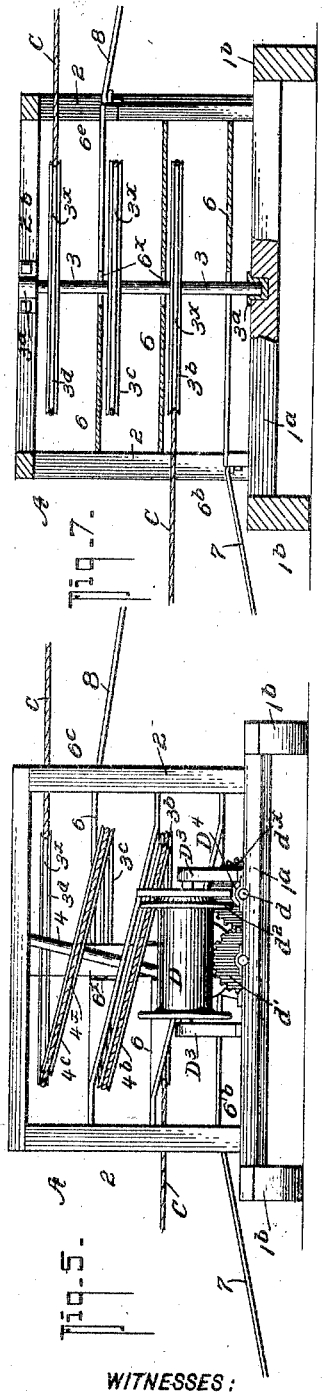
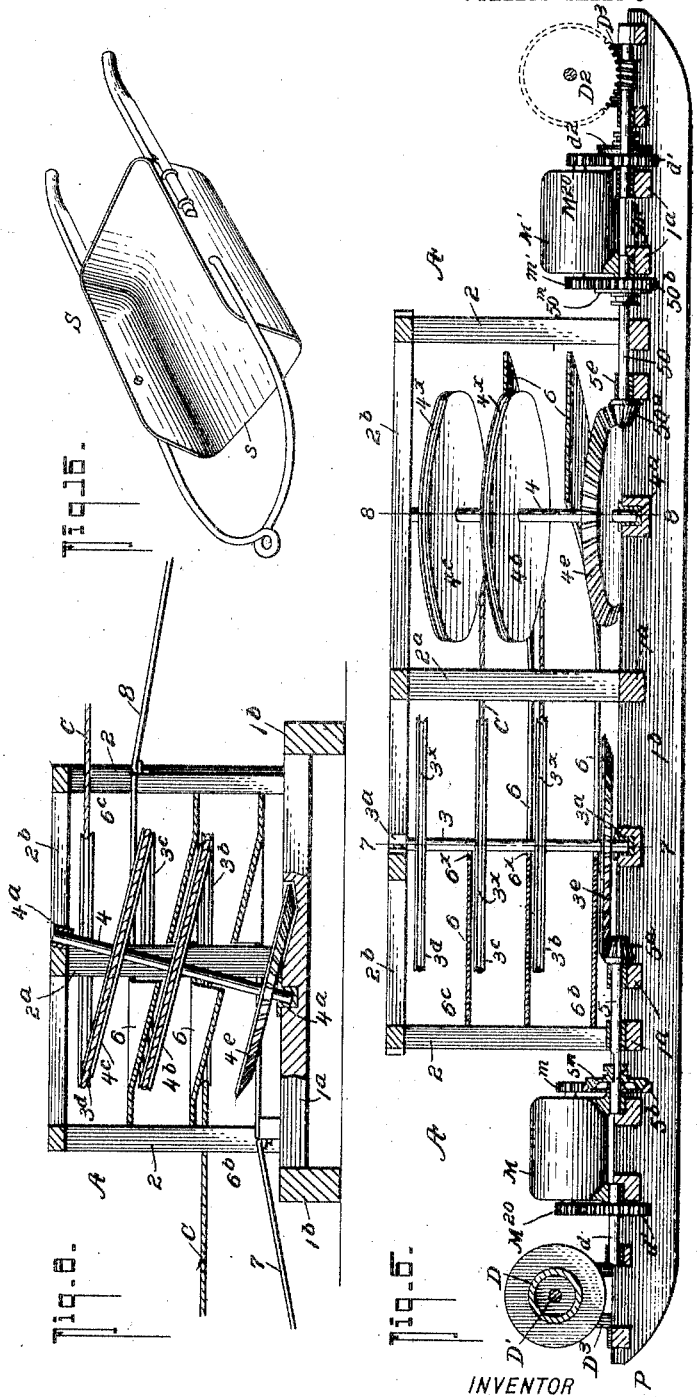
WITNESSES:
F. C. Gibson.
John G. Schrott.
INVENTOR
S. H. Bloomer.
BY
Fred G. Dieterich
ATTORNEYS No. 776,990. PATENTED DEC. 6, 1904.
S. H. BLOOMER.
GRADING AND EXCAVATING MACHINE.
APPLICATION FILED MAR. 8, 1904.
NO MODEL. 5 SHEETS—SHEET 4.
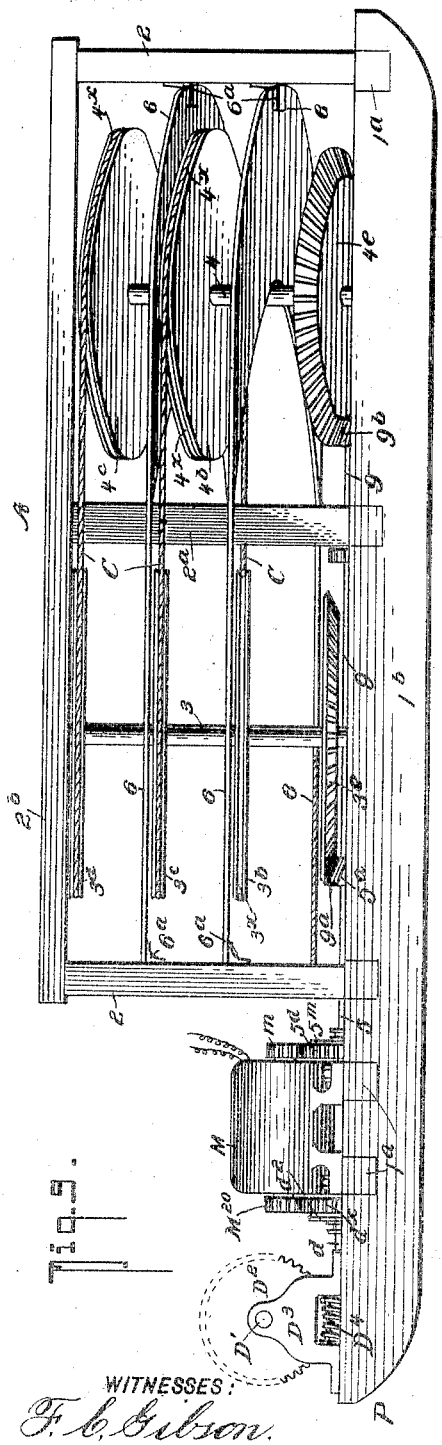
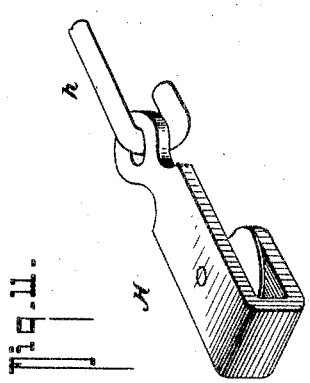
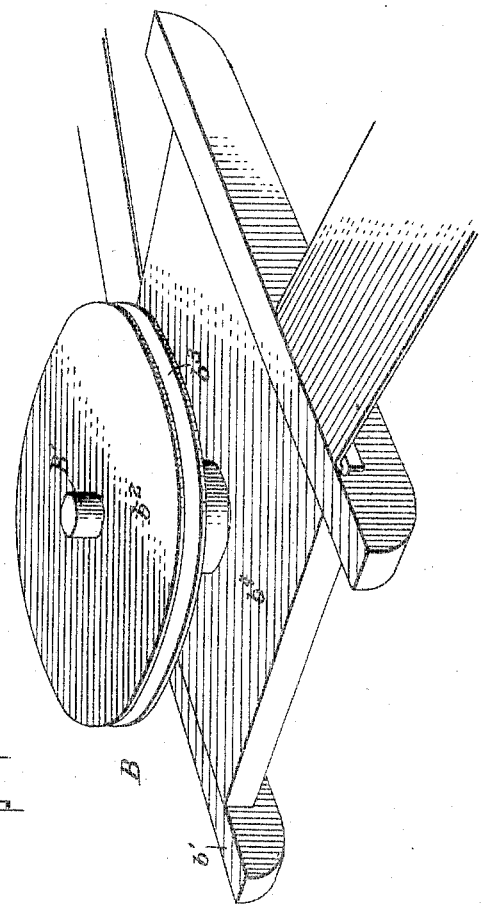
WITNESSES:
F. C. Gibson.
John L. Schorr.
INVENTOR
S. H. Bloomer.
BY
Fred G. Dieterich & Co.
ATTORNEYS No. 776,990. PATENTED DEC. 6, 1904.
S. H. BLOOMER.
GRADING AND EXCAVATING MACHINE.
APPLICATION FILED MAR. 8, 1904.
NO MODEL. 5 SHEETS—SHEET 5.

WITNESSES:
F. C. Gibson.
John T. Schron.

INVENTOR
S. H. Bloomer.
BY
Fred G. Dieterich
ATTORNEYS

No. 776,990. Patented December 6, 1904.

UNITED STATES PATENT OFFICE.

STEPHEN H. BLOOMER, OF SEATTLE, WASHINGTON.

GRADING AND EXCAVATING MACHINE.

SPECIFICATION forming part of Letters Patent No. 776,990, dated December 6, 1904.

Application filed March 8, 1904. Serial No. 197,138. (No model.)

*To all whom it may concern:*

Be it known that I, STEPHEN H. BLOOMER, residing at Seattle, in the county of King and State of Washington, have invented certain new and useful Improvements in Grading and Excavating Machines, of which the following is a specification.

My invention relates to improvements in grading and excavating apparatus; and it more particularly has for its object to provide an apparatus of this character for removing earth, gravel, &c., from one place to another for leveling surfaces, filling flats, and the like and which will be of a simple and economical construction and will effectively serve its intended purposes.

Generically my invention includes a machine having suitable drive mechanism comprising a sled capable of being moved from place to place as the occasion may require and upon which is mounted a suitable motor-driven power mechanism for imparting motion to one or more endless conveyer-cables supported at suitable intervals by sheaves and strung over the ground to be operated upon.

Furthermore, the invention includes suitable scrapers or plows which have a flexible connection with the endless conveyer-cables and which are adapted to be pulled over the ground by the said cables. I also provide suitable means for dumping the scrapers at suitable points to deposit the earth therein contained at the desired places.

With other objects in view, which will be hereinafter explained, the invention consists in certain novel construction and combination of parts, all of which will be first described in detail and then specifically pointed out in the appended claims, reference being had to the accompanying drawings, in which—

Figure 13:
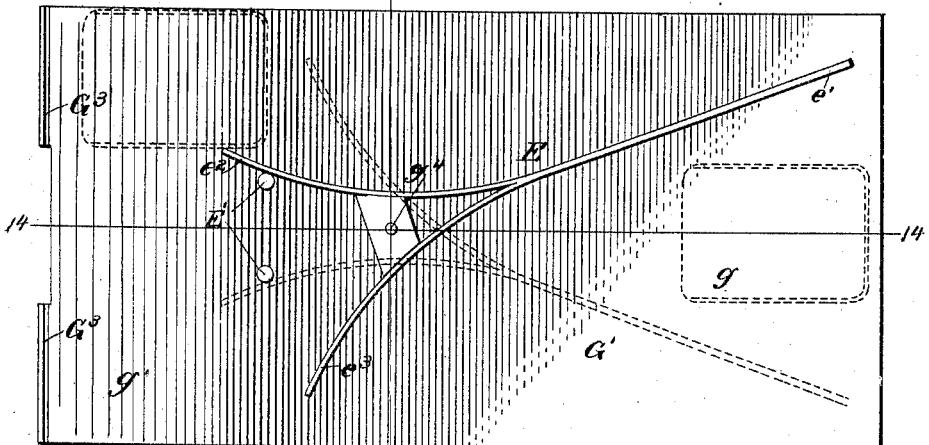
Figure 14:
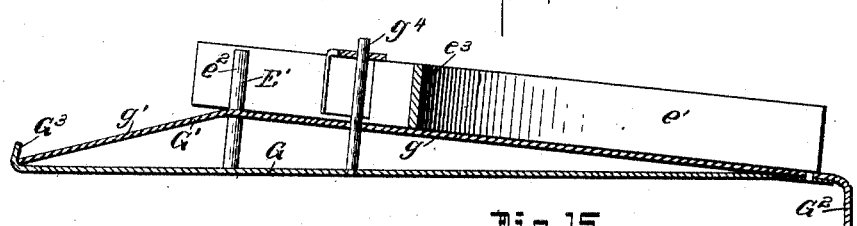
Figure 15:
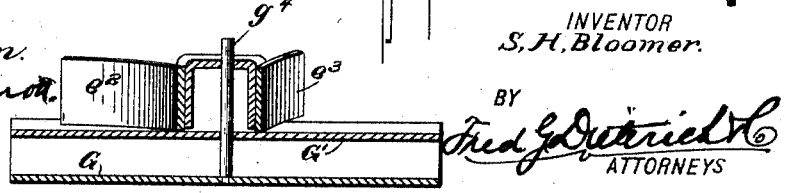

Figure 1 is a plan view of my invention as applied for use. Fig. 2 is a profile view thereof. Fig. 3 is an enlarged plan view of the cable-driving mechanism. Fig. 4 is a side elevation thereof. Fig. 5 is an end elevation of the cable-driving mechanism. Fig. 6 is a longitudinal section taken practically on the line 6 6 of Fig. 3. Fig. 7 is a cross-section on the line 7 7 of Fig. 6. Fig. 8 is a similar sectional view on the line 8 8 of Fig. 6. Fig. 9 is a detail side elevation of a slightly-modified form of the cable-driving mechanism hereinafter specifically referred to. Fig. 10 is a detail perspective view of one of the sheaves used to support the cable. Fig. 11 is a similar view of another form of sheave as used with my invention. Fig. 12 is a detail perspective view showing the means for dumping the scrapers. Fig. 13 is a plan view thereof. Fig. 14 is a longitudinal sectional view taken on the line 14 14 of Fig. 13. Fig. 15 is a cross-section on the line 15 15 of Fig. 13. Fig. 16 is an enlarged detail view of one of the scrapers.

Referring now to the accompanying drawings, in which like numerals and letters of reference indicate like parts in all the figures, A designates the cable-drive mechanism, which imparts motion to the endless conveyer-cable C, to which the scrapers or plows S are attached by the supplemental cable-sections $c$, as clearly shown in Figs. 1 and 2, and the cable C passes around suitable sheaves B and is held in any desired position relative to the ground to be worked upon by the supplemental sheaves H, connected by suitable guy-ropes $h$ to the posts or anchors $h'$, as shown.

Referring now more particularly to Figs. 3 to 8, inclusive, of the drawings, it will be seen the cable-drive mechanism A includes a sled, which consists of the side runner $1^b$, joined by the cross-bars $1^a$, and upon which is securely mounted a framework consisting of the corner-post 2, the center post $2^a$, and the cross-posts $2^b$. Mounted in bearings $3^a$ on the cross-bars $1^a 2^b$ and extending perpendicularly to the horizontal plane of the sled is a spindle 3, upon which at suitable intervals is fixedly secured a series of three sheaves $3^b$ $3^c$ $3^d$, having peripheral grooves $3^x$ and around which the endless conveyer-cable C is adapted to take. Secured to the spindle 3 near its lower end is a gear $3^e$, which meshes with a drive-pinion $5^a$ upon the drive-shaft 5, hereinafter again referred to. 4 designates a second spindle, mounted to rotate in bearings $4^a$ on the cross-arms $1^a 2^b$, but arranged to set at an angle to the horizontal plane, and the said spindle 4 carries a loose sheave $4^b$ and a fixedly-held sheave $4^c$, the sheaves $4^b 4^c$ being provided with periphery-grooves $4^x$ to receive the cable C. The spindle 4 is set at such an angle to the horizontal plane that the successive points of tangency between the cable C and the periphery of the sheaves $3^b$ $4^b$ will lie in the same horizontal plane. Near the lower end the spindle 4 carries a gear $4^e$, which meshes with a second drive-pinion $50^a$, preferably mounted upon a second drive-shaft 50, mounted in bearings $50^e$ and driven by a suitable power mechanism, which may be either steam or, as shown in the drawings, an electric motor M'. The shafts 5 and 50 have suitable clutch mechanisms $5^m$ and $50^m$ to engage the loose gears $5^b$ and $50^b$, meshing with their respective pinions $m'$ $m$ of their respective drive-motors M M', which may be either steam-driven or, as shown in the drawings, electrically driven, as desired. The motor M also includes a pinion $M^{20}$ to mesh with a loose gear $d'$ on a shaft $d$, upon which is mounted a clutch $d^2$, which carries a worm-gear $D^4$, meshing with a gear $D^2$ on a shaft $D'$, mounted in bearings $D^3$ at the end of the sled P and which carries a drum D for a purpose presently explained. Secured to posts 2 $2^a$ by brackets $6^a$ or otherwise mounted and between the sheaves mounted on the spindles 3 and 4 is a winding platform or guideway 6, having suitable apertures $6^x$ for the passage of the spindles 3 and 4. This platform or guideway 6 is in practice constructed of boiler-iron and serves to direct the scrapers in their course around the spindles 3 and 4 and from a lower to a higher plane, as will be hereinafter more fully explained. Joining with the entrant end $6^b$ of the guideway or platform 6 is a plate 7, which serves as an incline to assist the scrapers in entering the guideway or platform 6. A similar plate 8 is secured to the exit end $6^c$ of the winding-platform 6 to serve in directing the scrapers as they leave the platform 6, as is clearly shown in Figs. 3 and 8. In practice the cable C is passed around the sheaves $3^b$ $4^b$ $3^c$ $4^c$ $3^d$ and is held over a previously-surveyed course by the end sheaves B and the guy-sheaves E, (see Figs. 1 and 2,) and the said cable has a series of scrapers S, secured thereto by suitable auxiliary cables $c$.

The sheaves B (shown in detail in Fig. 10) preferably consist of a sled $b'$, upon which is rotatably mounted a sheave $b^2$, having a periphery-groove $b^3$ and around which the cable C passes. To insure easy passage of the scraper around the spindle B', I provide a guideway $b^4$, as shown. By providing a sled $b'$ for the sheaves B the same will serve as an anchor to prevent the sheaves moving from the position in which they have been previously set. The sheaves E are in the nature of half-opened sheaves and are secured to the posts E'; but they may be held in any desired position by guy-ropes, as shown in detail in Fig. 17.

Referring now more particularly to Figs. 11, 12, 13, and 14, it will be seen the scraper-dumping mechanism comprises a base-plate G, to which is secured a second plate G', bent to form suitable inclines $g$ $g'$, as clearly shown in Fig. 14. The plate G has its rear end bent downwardly, as at $G^2$, while the forward end of the plate G is bent slightly upward, as at $g^3$, to engage the free edge $s$ of the scraper S to retard its movement and to cause its cable C to tilt the scraper, as shown in Fig. 12. Fulcrumed on a pivot $g^4$, secured to the plate G, is a Y-shaped member, to which a rudder member E, having arms $e'$ $e^2$ $e^3$, is secured. This rudder member, which is automatic in its operation, serves to direct the scrapers from side to side, and the movement of the said rudder E may be limited by stops E'. By providing the Y-shaped rudder member E, as shown, as the first scraper comes in contact with the arm $e'$ it will shove said rudder E to the position shown in full lines in Fig. 13, so that the next succeeding scraper will be directed by the arm $e'$ to pass on the other side of the rudder, as shown in dotted lines in Fig. 13, and as the second scraper comes in contact with the arm $e'$ the rudder E will be again moved to the position shown in full lines in Fig. 13, so that the third scraper will pass on the side on which the first scraper has passed and the fourth scraper pass on the side the second scraper has passed, and so on.

In Fig. 9 I have shown a slightly-modified form of the cable-drive mechanism in which the second drive-motor M' and its coöperating parts are dispensed with and both spindles 3 and 4 receive their motion from the shaft 5, the gear $3^e$ on the shaft 3 meshing with the pinion $5^a$ on the shaft 5, which pinion $5^a$ in turn meshes with a pinion $9^a$ on a supplemental shaft 9, carrying a second pinion $9^b$, which meshes with the gear $4^e$ on the spindle 4.

The drum D is adapted to receive a cable $D^{10}$, which is suitably anchored, as at $d^{10}$, (see Fig. 3,) to move the sled from place to place as occasion may require.

So far as desired the operation of my invention may best be explained as follows: The course or ground to be operated upon is first determined by a suitable survey or otherwise and the cable-driving mechanism moved into a position at the most suitable point. The sheaves B are then placed in their positions and securely anchored, after which the cable C is strung and the plows or scrapers S attached to the cable C, as before described. Should the cable C not lie directly over the course to be operated upon, the same may be held in position by the auxiliary sheaves H, as shown in Fig. 1. The drive mechanism is generally placed at the point where the earth is to be removed. The scraper-dumping mechanism is then placed into position at the point where the earth is to be deposited and the cable-drive mechanism set in motion. Now as the scrapers are moved forward by the cable they will become filled with earth, dirt, or gravel and be carried forward to the dumping mechanism, which, operating in the manner before described, will cause the scrapers to dump their load at the place desired. In dumping the scrapers they are upset and may be righted by a suitable attendant before they can reach the driving mechanism. After the scrapers have been dumped they pass onward and are carried around the end sheaves to the drive mechanism. As they arrive at the drive mechanism they will pass up the incline onto the winding-platform 6 and be carried around the spindles 3 and 4 and pass up to the exit end of the machine onto the incline end, whence they will be again carried to the place where they become again filled with earth.

From the foregoing it will be seen that I have provided a very simple grading and excavating machine and one which will require few operators and very little attention, which is automatic and simple in its operation, and which will effectively serve its intended purposes. Again, it will be seen the apparatus herein described can be readily thrown out in any direction desired by the use of the half-opened sheaves, which may be fastened to any suitable anchorage or supports as desired.

By constructing the drive mechanism as shown and described it will be readily seen that with the two sets of sheaves or pulleys a greater adhesion of the cable is obtained, and hence a more positive movement can be given thereto than otherwise.

From the foregoing description, taken in connection with the accompanying drawings, it is thought that the advantages and complete operation of my invention will be readily understood by those skilled in the art to which it appertains, and I desire it understood that slight changes in the detail construction and arrangement of parts may be made without departing from the scope of the invention and the appended claims.

Having thus described my invention, what I claim, and desire to secure by Letters Patent, is—

1. An apparatus of the character stated comprising in combination with an endless cable, a drive mechanism therefor, said drive mechanism including rotatable sheaves around which the cable takes, scrapers joined with said cable and movable therewith and adapted to be carried around said drive-mechanism sheaves, substantially as shown and described.

2. An apparatus of the character stated comprising in combination with an endless cable, a drive mechanism therefor, scrapers joined with said cable, said drive mechanism including rotatable sheaves, means coöperating with said drive mechanism for guiding said scrapers around said sheaves, substantially as shown and described.

3. An apparatus of the character stated comprising in combination with an endless conveyer-cable, conveyers joined therewith, means for imparting motion to said cable in one direction, said means including a drive mechanism having a plurality of rotatable pulleys or sheaves around which the cable is wound, and means for automatically dumping said conveyers without stopping their forward movement, substantially as shown and described.

4. An apparatus of the character stated comprising in combination with an endless conveyer-cable, conveyers joined therewith, means for imparting a unidirectional movement to said cable, said means including a drive mechanism having a plurality of rotatable pulleys or sheaves around which the cable passes, said drive mechanism also including a winding-platform for directing the scrapers in their movement around said sheaves for the purposes specified.

5. An apparatus of the character stated comprising in combination with an endless cable, conveyers joined therewith, means for imparting unidirectional motion to said cable, said means including a drive mechanism having a plurality of rotatable pulleys or sheaves around which the cable passes, said drive mechanism also including a winding-platform held between said sheaves for directing the scrapers in their movement around said sheaves, substantially as shown and described.

6. In an apparatus of the character stated, a drive mechanism, said drive mechanism comprising in combination with a sled, a pair of spindles mounted thereon, sheaves secured to said spindles, a winding-platform mounted on the sled, and means for imparting motion to said spindles, substantially as shown and for the purposes specified.

7. In an apparatus of the character stated, a drive mechanism comprising in combination with a sled, spindles mounted thereon, sheaves secured to said spindles, a winding-platform mounted on the sled between said sheaves, and means for imparting motion to said spindles, substantially as shown and for the purposes described.

8. In an apparatus of the character stated, a drive mechanism comprising in combination with a sled, a pair of spindles mounted thereon, sheaves secured to said spindles, a winding-platform mounted on the sled between said sheaves, a drive-motor for imparting motion to said spindles, a drum mounted on said sled and operated by said drive-motor for the purposes specified.

9. An apparatus of the character stated comprising in combination with an endless conveyer-cable, a drive mechanism therefor, scrapers joined with said conveyer-cable, said drive mechanism including a pair of spindles, grooved sheaves mounted on said spindles for receiving the cable, a winding-platform held between said sheaves for directing the scrapers in their travel around the spindles and through the drive mechanism, and means for imparting movement to said spindles to operate said cable, substantially as shown and described.

10. An apparatus of the character stated comprising in combination with an endless conveyer-cable, a drive mechanism therefor, scrapers joined with said conveyer-cable, said drive mechanism including a pair of spindles, grooved sheaves mounted on said spindles for receiving the cable, a winding-platform held between said sheaves for directing the scrapers in their travel around the spindles and through the drive mechanism, means for imparting movement to said spindles to operate said cable, said means including gears mounted on the spindles and a drive-motor geared with said spindle-gears.

11. An apparatus of the character stated comprising in combination with an endless conveyer, scrapers joined therewith, means for driving said conveyer continuously in one direction, means for alternately dumping said scrapers at predetermined times without stopping the continuous movement of the conveyers, said dumping means including a base-plate having upturned portions at one end for engaging the edge of said scrapers to retard their movement, and means mounted on said base-plate to guide said scrapers into engagement with said upturned portions substantially as shown and described.

12. An apparatus of the character stated, comprising in combination with an endless conveyer, scrapers joined therewith, means for driving said conveyer, means for alternately dumping said scrapers at predetermined times, said dumping means including a base-plate having upturned portions at one end for engaging the edge of the scrapers to retard their movement, and a rudder mounted on said base-plate for directing said scrapers to said upturned portions of the base-plate to dump the same, substantially as shown and described.

13. An apparatus of the character stated comprising in combination with an endless conveyer and scrapers connected therewith, a dumping device including a base-plate having upturned portions at one end, a Y-shaped rudder member pivotally mounted on said plate and adapted to be moved from one position to another by the scrapers as they are moved over the plate to direct the scrapers into engagement with said upturned portions to dump the scrapers, substantially as shown and described.

14. A dumping device for excavating apparatus, comprising in combination with a conveyer and scrapers attached thereto, of a base-plate having a plurality of upturned portions at one end, a rudder member pivotally mounted on said plate and operated by the passing scrapers for directing the scrapers into engagement with the upturned portions of the base for the purposes specified.

15. An apparatus of the character described comprising in combination with an endless conveyer-cable and scrapers or conveyer members attached to said cable, a dumping mechanism for said scrapers, said dumping mechanism comprising a base member having a plurality of upturned lips at one end, a rudder pivotally mounted on said base member to be engaged and set by the passing scrapers, said rudder serving to direct said scrapers into engagement with said lips for the purposes specified.

16. An excavating apparatus comprising in combination with a continuously-moving cable conveyer, means for excavating and carrying the dirt from one place, moving the same parallel with the conveyer-cable to a predetermined point, and means for automatically depositing said dirt at said point on one side or the other of the cable, substantially as shown and for the purposes specified.

STEPHEN H. BLOOMER.

Witnesses:
STANLEY YOWELL,
WILLIAM PEDDLE.